(12) United States Patent  
Zhang et al.

(10) Patent No.: US 11,153,200 B2  
(45) Date of Patent: Oct. 19, 2021

(54) NETWORK SERVICE MANAGEMENT METHOD, APPARATUS, AND SYSTEM

(71) Applicant: HUAWEI TECHNOLOGIES CO., LTD., Guangdong (CN)

(72) Inventors: Haodi Zhang, Shenzhen (CN); Xiangtong Qi, Hong Kong (CN); Tao Peng, Shenzhen (CN); Weiping Xu, Dongguan (CN); Shucheng Liu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 15/931,244

(22) Filed: May 13, 2020

(65) Prior Publication Data

US 2020/0274794 A1    Aug. 27, 2020

Related U.S. Application Data

(63) Continuation of application No. PCT/CN2018/115307, filed on Nov. 14, 2018.

(30) Foreign Application Priority Data

Nov. 15, 2017    (CN) .......................... 201711126398.3

(51) Int. Cl.  
*H04L 12/725* (2013.01)  
*H04L 12/28* (2006.01)

(52) U.S. Cl.  
CPC ........ *H04L 45/302* (2013.01); *H04L 12/2854* (2013.01)

(58) Field of Classification Search  
CPC . H04L 45/302; H04L 12/2854; H04L 45/306; H04L 45/125; H04L 45/42;  
(Continued)

(56) References Cited

U.S. PATENT DOCUMENTS 6,643,612 B1    11/2003  Lahat et al.  
7,082,463 B1     7/2006  Bradley et al.  
(Continued)

FOREIGN PATENT DOCUMENTS

CN    102845032 A    12/2012  
CN    103685033 A     3/2014  
(Continued)

*Primary Examiner* — Charles C Jiang  
*Assistant Examiner* — Shawn D Miller  
(74) *Attorney, Agent, or Firm* — Womble Bond Dickinson (US) LLP

(57) ABSTRACT

A controller receives an access request message of a to-be-served flow that is sent by a network device. The access request message includes an identifier of the to-be-served flow and an identifier of a terminal that sends the to-be-served flow. The controller determines service level information of the to-be-served flow based on the identifier of the terminal and the identifier of the to-be-served flow. The controller determines a transmission path of the to-be-served flow and a transmission path of a being-served flow based on the service level information of the to-be-served flow and service level information of the being-served flow. The controller publishes the transmission path of the to-be-served flow and the transmission path of the being-served flow to the network device.

20 Claims, 5 Drawing Sheets

(58) Field of Classification Search
CPC ..... H04L 45/50; H04L 45/64; H04L 41/5025; H04L 41/5006; H04L 43/16; H04L 41/0896; H04L 41/0893; H04L 43/0882; H04L 41/5012; H04L 41/5054
See application file for complete search history.

(56) References Cited

U.S. PATENT DOCUMENTS

| | | |
|---|---|---|
| 9,191,282 B2 | 11/2015 | Kakadia et al. |
| 2011/0242978 A1 | 10/2011 | Klein et al. |
| 2015/0063112 A1 | 3/2015 | Wu et al. |
| 2015/0304281 A1 | 10/2015 | Kasturi et al. |
| 2016/0065422 A1 | 3/2016 | Khargharia et al. |
| 2016/0080263 A1 | 3/2016 | Park et al. |
| 2016/0164787 A1 | 6/2016 | Roach et al. |
| 2017/0078176 A1 | 3/2017 | Lakshmikantha et al. |
| 2019/0028374 A1 | 1/2019 | Xu et al. |
| 2019/0036814 A1* | 1/2019 | Aranha ................. H04L 47/825 |
| 2019/0052558 A1* | 2/2019 | Mehta ................... H04L 41/142 |

FOREIGN PATENT DOCUMENTS

| | | |
|---|---|---|
| CN | 104202264 A | 12/2014 |
| CN | 104301251 A | 1/2015 |
| CN | 104468352 A | 3/2015 |
| CN | 104994033 A | 10/2015 |
| CN | 105450521 A | 3/2016 |
| CN | 106664248 A | 5/2017 |
| CN | 106789658 A | 5/2017 |
| CN | 107231662 A | 10/2017 |
| EP | 1993231 A1 | 11/2008 |
| WO | 2015199592 A1 | 12/2015 |
| WO | 2016029945 A1 | 3/2016 |

* cited by examiner

NETWORK SERVICE MANAGEMENT METHOD, APPARATUS, AND SYSTEM

CROSS-REFERENCE TO RELATED APPLICATIONS

This application is a continuation of International Application No. PCT/CN2018/115307, filed on Nov. 14, 2018, which claims priority to Chinese Patent Application No. 201711126398.3, filed on Nov. 15, 2017. The disclosures of the aforementioned applications are hereby incorporated by reference in their entireties.

STATEMENT OF JOINT RESEARCH AGREEMENT

The subject matter and embodiments of the claimed invention were made by or on the behalf of Hong Kong University of Science and Technology, of Clear Water Bay, Kowloon, Hong Kong, P.R. China and Huawei Technologies Co., Ltd., of Shenzhen, Guangdong Province, P.R. China, under a joint research agreement titled "network service management method, apparatus, and system". The joint research agreement was in effect on or before the embodiments of the claimed invention were made. The embodiments of the claimed invention were made as a result of activities undertaken within the scope of the joint research agreement.

TECHNICAL FIELD

This application relates to the field of wide area network data transmission technologies, and in particular, to a network service management method, apparatus, and system.

BACKGROUND

Software-defined networking in a wide area network (SD-WAN) is a technology that applies a software-defined networking (SDN) technology to a wide area network (WAN). The SD-WAN technology centrally manages devices at different WAN network borders and connects these devices through logical connections across physical WAN networks. The SD-WAN uses the SDN technology that can separate a control plane from a data plane, to continuously monitor network performance in the data plane, and aggregate information to a controller. In this way, the controller can learn a status of an entire network, adjust a service route based on a current network status, dynamically share traffic on a plurality of WAN connections, and conveniently configure a new policy for the router.

A service level agreement (SLA) is an agreement or contract reached between an enterprise that provides an SD-WAN service and a customer (e.g., an SD-WAN user) on service quality, level, performance, and the like. An SD-WAN service provider needs to provide the SD-WAN user with a service that meets the signed SLA based on the SLA signed by the SD-WAN user. If the SD-WAN service provider cannot meet the SLA signed by the SD-WAN user, the SD-WAN service provider compensates the SD-WAN user according to an agreed compensation solution.

To meet the SLA signed by the SD-WAN user, in an implementation, when a new flow arrives at the controller, the controller first determines a flow type. If the flow is a flow that does not need to ensure quality of service (QoS), for example, a data flow, the controller calculates a shortest path based on a conventional routing algorithm. If the flow is a flow that needs to ensure the QoS, for example, a video flow, the controller first determines whether a current remaining resource can accept the flow. If the controller currently can accept the flow, the controller calculates a path of the flow by using a QoS routing algorithm. If the controller currently cannot accept the flow, the controller further needs to determine whether to accept the flow if the controller adjusts a path of a being-transmitted flow. When the controller can accept the flow after adjusting the path of the being-transmitted flow, the controller adjusts the path of the being-transmitted flow. When the controller still cannot accept the flow after adjusting the being-transmitted flow, the controller calculates a shortest path based on the conventional routing algorithm.

In the foregoing implementation, a new flow is processed only according to a first-come first-served rule, to meet a service level of a flow that first arrives, but not a service level of a flow that arrives later. However, this cannot achieve an optimal solution of enabling as many SD-WAN users as possible to reach the service level agreement signed between the SD-WAN users and the SD-WAN service provider.

SUMMARY

Embodiments of the application provide a network service management method, apparatus, and system, and determine a transmission path of a to-be-served flow and a transmission path of a being-served flow, so that as many SD-WAN users as possible meet an optimal solution of a service level agreement.

The embodiments of the application are implemented as follows.

At least one embodiment of the application provides a network service management method, where the method includes:

receiving, by a controller, an access request message that is of a to-be-served flow and that is sent by a network device, where the access request message includes an identifier of the to-be-served flow and an identifier of a terminal that sends the to-be-served flow;

determining, by the controller, service level information of the to-be-served flow based on the identifier of the terminal and the identifier of the to-be-served flow;

determining, by the controller, a transmission path of the to-be-served flow and a transmission path of a being-served flow based on the service level information of the to-be-served flow and service level information of the being-served flow, where the to-be-served flow is a flow to which no network path is allocated, and the being-served flow is a flow to which a network path is allocated; and publishing, by the controller, the transmission path of the to-be-served flow and the transmission path of the being-served flow to the network device.

In least one embodiment, the controller simultaneously determines paths of the to-be-served flow and the being-served flow based on content of a plurality of aspects, and dynamically adjusts the to-be-served flow and the being-served flow. In this way, as many SD-WAN users as possible can reach an optimal solution of a service level agreement signed between the SD-WAN users and an SD-WAN service provider. This improves network user satisfaction.

In an embodiment, the method further includes:

receiving, by the controller, a network status message sent by the network device, where the network status message includes a network available path type, a quantity of links of each path type, and a remaining available bandwidth of each link; and determining, by the controller, the transmission path of the to-be-served flow and the transmission path of the being-served flow based on the available path type, the quantity of links of each path type, the remaining available bandwidth of each link, and bandwidths required by the to-be-served flow and the being-served flow, where the available path type includes a first path type and a second path type, the first path type is a multi-protocol label switching MPLS path that needs to ensure flow transmission quality, and the second path type is a network path that does not need to ensure the flow transmission quality.

In an embodiment, the determining, by the controller, a transmission path of the to-be-served flow and a transmission path of a being-served flow based on the service level information of the to-be-served flow and service level information of the being-served flow includes:

that the service level information of the to-be-served flow includes a service class, a target service level, a current service level, and a remaining period of service time of the to-be-served flow; and determining, by the controller, the transmission path of the to-be-served flow and the transmission path of the being-served flow based on service classes, target service levels, current service levels, and remaining periods of service time of the to-be-served flow and the being-served flow.

In an embodiment, the determining, by the controller, a transmission path of the to-be-served flow and a transmission path of a being-served flow based on the service level information of the to-be-served flow and service level information of the being-served flow includes:

determining, by the controller, the transmission path of the to-be-served flow and the transmission path of the being-served flow by using a constraint condition, where the constraint condition includes:

Maxmize $\Sigma_{j,k} W_j^k x_j^k$;

$x_j^k - \Sigma_m y_{j,m}^k = 1 \forall j,k$; and $\Sigma_{m,j,k} e_m y_{j,m}^k \upsilon_j^k \leq c_e$, $\forall e$, where a priority parameter $w_j^k = k + c_j^k + \lambda_j (c_j^k - b_j^k)(1 - Q_j^k)/Q_j^k$; and $y_{j,m}^k$ is used to indicate whether a k-level service class requested by a user j is allocated to an $m^{th}$ MPLS path, $e_m$ is used to indicate whether the $m^{th}$ MPLS passes through a link e, $c_e$ is used to indicate a link bandwidth of the link e, $\upsilon_j^k$ is used to indicate a bandwidth required by the k-level service class requested by the user j, $x_j^k$ is used to indicate whether the k-level service class requested by the user j is allocated to the MPLS path, $c_j^k$ is used to indicate a target service level of the k-level service class requested by the user j, $b_j^k$ is used to indicate a current service level of the k-level service class requested by the user j, $Q_j^k$ is used to indicate a percentage of a remaining period of service time of the k-level service class requested by the user j, and $\lambda_j$ is a corrected parameter of the user j.

In an embodiment, the method further includes:

when a remaining period of service time of a software-defined networking in a wide area network (SD-WAN) user corresponding to the terminal is less than a first time threshold and/or a current service level of the SD-WAN user is less than a second service level threshold, increasing, by the controller, a value of a corrected parameter of the SD-WAN user.

In an embodiment, the determining, by the controller, service level information of the to-be-served flow based on the identifier of the to-be-served flow and the identifier of the terminal includes:

that the identifier of the terminal is an internet protocol (IP) address or a port number of the terminal, and determining, by the controller, the SD-WAN user corresponding to the terminal based on the IP address or the port number of the terminal;

that the identifier of the to-be-served flow is a flow type, and determining, by the controller, a service class of the to-be-served flow based on a type of the to-be-served flow; and determining, by the controller, the service level information of the to-be-served flow based on the SD-WAN user and the service class.

In an embodiment, the method further includes:

when a period of service time of the SD-WAN user is less than a third threshold, sending, by the controller, warning information to a network management server, to send the warning information to the SD-WAN user by using the network management server.

An embodiment of the application provides a network service reservation method, where the method includes:

sending, by a network management server, a service level agreement to a software-defined networking in a wide area network (SD-WAN) user, where the service level agreement includes a service class, a target service level, a current service level, and a remaining period of service time of a flow, and the service level agreement is used to serve transmission of different flow types;

receiving, by the network management server, a service level agreement signed by the SD-WAN user, where the service level agreement includes at least one service class; and sending, by the network management server, the service level agreement signed by the SD-WAN user to a controller, so that the controller determines a transmission path of a flow of the SD-WAN user based on the service level agreement signed by the SD-WAN user.

An embodiment of the application provides a network service management apparatus, where the apparatus includes:

a receiving unit, configured to receive an access request message that is of a to-be-served flow and that is sent by a network device, where the access request message includes an identifier of the to-be-served flow and an identifier of a terminal that sends the to-be-served flow;

a processing unit, configured to determine service level information of the to-be-served flow based on the identifier of the to-be-served flow and the identifier of the terminal, where the processing unit is further configured to determine a transmission path of the to-be-served flow and a transmission path of a being-served flow based on the service level information of the to-be-served flow and service level information of the being-served flow, where the to-be-served flow is a flow to which no network path is allocated, and the being-served flow is a flow to which a network path is allocated; and a sending unit, configured to publish the transmission path of the to-be-served flow and the transmission path of the being-served flow to the network device.

In an embodiment, where the receiving unit is configured to receive a network status message sent by the network device, where the network status message includes a network available path type, a quantity of links of each path type, and a remaining available bandwidth of each link; and the processing unit is configured to determine the transmission path of the to-be-served flow and the transmission path of the being-served flow based on the available path type, the quantity of links of each path type, the remaining available bandwidth of each link, and bandwidths required by the to-be-served flow and the being-served flow, where the available path type includes a first path type and a second path type, the first path type is a multi-protocol label switching MPLS path that needs to ensure flow transmission quality, and the second path type is a network path that does not need to ensure the flow transmission quality.

In an embodiment, that the processing unit is configured to determine a transmission path of the to-be-served flow and a transmission path of a being-served flow based on the service level information of the to-be-served flow and service level information of the being-served flow includes:

that the service level information of the to-be-served flow includes a service class, a target service level, a current service level, and a remaining period of service time of the to-be-served flow; and the processing unit, configured to determine the transmission path of the to-be-served flow and the transmission path of the being-served flow based on service levels, target service levels, current service levels, and remaining periods of service time of the to-be-served flow and the being-served flow.

In an embodiment, that the processing unit is configured to determine a transmission path of the to-be-served flow and a transmission path of a being-served flow based on the service level information of the to-be-served flow and service level information of the being-served flow includes:

the processing unit, configured to determine the transmission path of the to-be-served flow and the transmission path of the being-served flow based on a constraint condition, where the constraint condition includes:

Maxmize $\Sigma_{J,k} W_j^k x_j^k$;
$x_j^k - \Sigma_m y_{j,m}^k = 1 \forall j,k$; and
$\Sigma_{m,j,k} e_m y_{j,m}^k \upsilon_j^k \le c_e$, $\forall e$, where
a priority parameter $w_j^k = k + c_j^k + \lambda_j (c_j^k - b_j^k)(1 - Q_j^k)/Q_j^k$; and $y_{j,m}^k$ is used to indicate whether a k-level service class requested by a user j is allocated to an $m^{th}$ MPLS path, $e_m$ is used to indicate whether the $m^{th}$ MPLS passes through a link e, $c_e$ is used to indicate a link bandwidth of the link e, $\upsilon_j^k$ is used to indicate a bandwidth required by the k-level service class requested by the user j, $x_j^k$ is used to indicate whether the k-level service class requested by the user j is allocated to the MPLS path, $c_j^k$ is used to indicate a target service level of the k-level service class requested by the user j, $b_j^k$ is used to indicate a current service level of the k-level service class requested by the user j, $Q_j^k$ is used to indicate a percentage of a remaining period of service time of the k-level service class requested by the user j, and $\lambda_j$ is a corrected parameter of the user j.

In an embodiment, where when a remaining period of service time of a software-defined networking in a wide area network (SD-WAN) user corresponding to the terminal is less than a first time threshold and/or a current service level of the SD-WAN user is less than a second service level threshold, the processing unit is further configured to increase a value of a corrected parameter of the SD-WAN user.

In an embodiment, that the processing unit is further configured to determine service level information of the to-be-served flow based on the identifier of the to-be-served flow and the identifier of the terminal includes:

that the identifier of the terminal is an internet protocol (IP) address or a port number of the terminal, and the processing unit, configured to determine the SD-WAN user corresponding to the terminal based on the IP address or the port number of the terminal;

that the identifier of the to-be-served flow is a flow type, and the processing unit, configured to determine a service class of the to-be-served flow based on a type of the to-be-served flow; and the processing unit, configured to determine service level information of the to-be-served flow based on the SD-WAN user and the service level.

In an embodiment, when a period of service time of the SD-WAN user is less than a third threshold, the processing unit is configured to send warning information to a network management server, to send the warning information to the SD-WAN user by using the network management server.

An embodiment of the application provides a network service reservation apparatus, including:

a sending unit, configured to send a service level agreement to a software-defined networking in a wide area network SD-WAN user, where the service level agreement includes a service class, a target service level, a current service level, and a remaining period of service time of a flow, and the service level agreement is used to serve transmission of different flow types; and a receiving unit, configured to receive a service level agreement signed by the SD-WAN user, where the service level agreement includes at least one service class, where the sending unit is further configured to send the service level agreement signed by the SD-WAN user to a controller, so that the controller determines a transmission path of a flow of the SD-WAN user based on the service level agreement signed by the SD-WAN user.

An embodiment of the application provides a network service management apparatus, including a processor and a memory, where the memory stores an operation instruction that can be executed by the processor, and the processor reads the operation instruction in the memory to implement embodiments of the method as described herein.

An embodiment of the application provides a computer-readable storage medium, including an instruction. When the instruction is run on a computer, the computer is enabled to perform embodiments of the method as described herein.

An embodiment of the application provides a service management system. The service management system includes a network service reservation apparatus and a network service management apparatus.

The network service management apparatus is configured to perform embodiments of the method as described herein.

DESCRIPTION OF EMBODIMENTS

The following describes the technical solutions provided in the embodiments of the application in detail with reference to the accompanying drawings.

Figure 1:
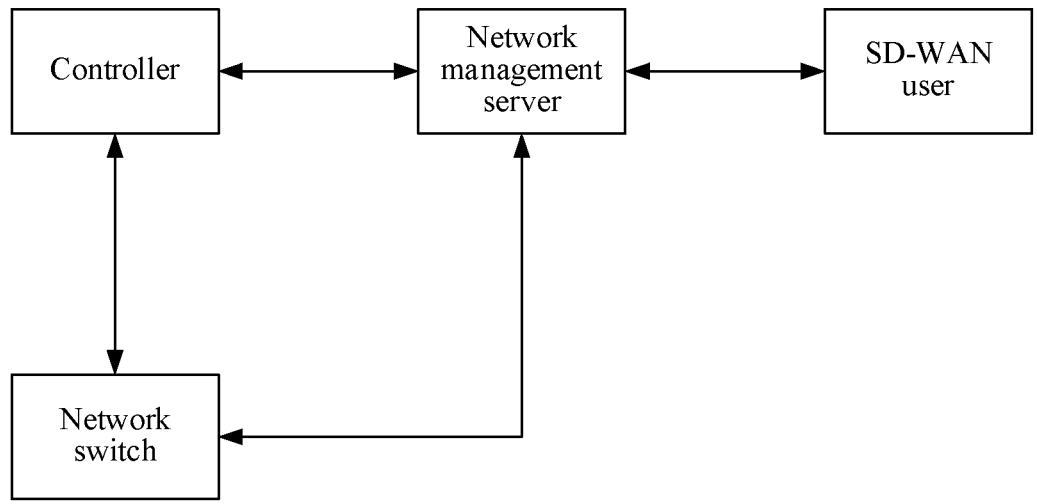
FIG. 1 shows a network service management system according to an embodiment of the application.

FIG. 1 shows a network service management system according to an embodiment of the application. As shown in FIG. 1, the system includes a software-defined networking in a wide area network (SD-WAN) user, a network management server, a controller, and a network switch.

In an embodiment of the application, the network switch may alternatively be a router or another network device configured to forward data. The controller in FIG. 1 may alternatively be one or more controllers. The controller may also be referred to as a network service management apparatus in the application.

A terminal corresponding to the SD-WAN user may send a flow to the network switch. The network switch forwards an access request message of the flow to the controller, so that the controller determines a transmission path of the flow. After determining the transmission path of the flow, the controller further returns the determined transmission path to the network switch, so that the network switch forwards the flow based on the determined path.

In an embodiment of the application, the transmission path determined by the controller may include a first path type that needs to ensure flow transmission quality and a second path type that does not need to ensure the flow transmission quality. For example, the first path type may be any one of paths such as a multi-protocol label switching (MPLS) path and a virtual private network (VPN) path, and the second path type is a common path in the internet.

In an embodiment of the application, an example in which the first path type is the MPLS path and the second path type is the common path in the internet network is used for description. The common path in the internet network does not need to ensure quality of service (QoS) when a flow is transmitted on the common path, and the MPLS path is a path that needs to ensure the QoS. Compared with the common path in the internet network, the MPLS path only analyzes an internet protocol (IP) header at an edge of a network when transmitting data, instead of analyzing the IP header at each hop. This reduces data sending time, improves flow transmission efficiency, and ensures flow transmission quality.

That the controller determines the transmission path of the flow includes: adjusting a transmission path of a being-served flow and determining a transmission path of a to-be-served flow. In other words, the controller may not only determine the transmission path of the to-be-served flow, but also adjust the path of the being-served flow, to dynamically adjust the flow based on a flow type, ensure the flow transmission quality, improve the flow transmission efficiency, and improve user satisfaction. In the application, the being-served flow is a flow to which the controller has allocated a transmission path, and the allocated path may be the MPLS path. The to-be-served flow is a flow to which the controller has not allocated a transmission path to the flow.

Before the terminal sends an access request message of the to-be-service flow to the network switch, the SD-WAN user corresponding to the terminal further needs to sign a service level agreement (SLA) with the network management server. The network management server is configured to send provided SLA to the SD-WAN user. The SD-WAN user selects an SLA and determines a corresponding service class and service time.

The network management server sends the service level agreement (SLA) to the SD-WAN user. The SLA includes a plurality of service classes. The SD-WAN user determines, based on an actual usage condition, at least one service class that matches a requirement of the SD-WAN user.

In the prior art, an SLA provided by a network management server for an SD-WAN user is only for a specific application of the user at specific time. However, requirements of the user change dynamically. A same user may use a plurality of applications, and different applications have different network requirements. For example, a video conference application is sensitive to a latency, file download is sensitive to a bandwidth, and web page browsing does not have a high requirement on service quality. It is difficult for a service provider to accurately estimate a demand of each application. As a result, a service level signed by the SD-WAN user exceeds an actual requirement, resulting in a waste. Alternatively, the signed service level cannot meet a use requirement, resulting in performance deterioration.

The service level provided in the application may enable the SD-WAN user to sign a plurality of classes of SLAs with the network management server based on different flow types, to better meet the use requirement of the user. The service level agreement signed by the SD-WAN user includes a required bandwidth, a service achievement rate, and a period of service time, so that the controller can flexibly adjust a path of a flow.

When determining the path of the flow, the controller simultaneously adjusts the path of the being-served flow and the path of the to-be-served flow, so that all flows can determine, based on a current service level, a specific path for transmission. This avoids that in the prior art, a transmission path is allocated to a to-be-served flow only based on a remaining bandwidth of an MPLS path, a path is not adjusted for a flow that has been allocated to the MPLS path, and the transmission path of the flow cannot be dynamically adjusted in real time.

In an embodiment of the application, after signing the SLA with the SD-WAN user, the network management server further sends the SLA signed by the SD-WAN user to the controller.

The controller manages a transmission path of a flow of the SD-WAN user. In an embodiment, after signing the SLA with the SD-WAN user, the network management server further sends the SLA signed by the SD-WAN user to the controller. After obtaining the access request message that is of the to-be-served flow and that is sent by the SD-WAN user, the network management server sends the access request message to the controller. The controller further stores a transmission path with an allocated flow.

After determining the transmission path of the to-be-served flow or the being-served flow, the controller further sends the determined transmission path to another network device node in the SD-WAN network, so that when the flow arrives at any node in the SD-WAN network, the flow can be configured based on the determined transmission path.

Figure 2:
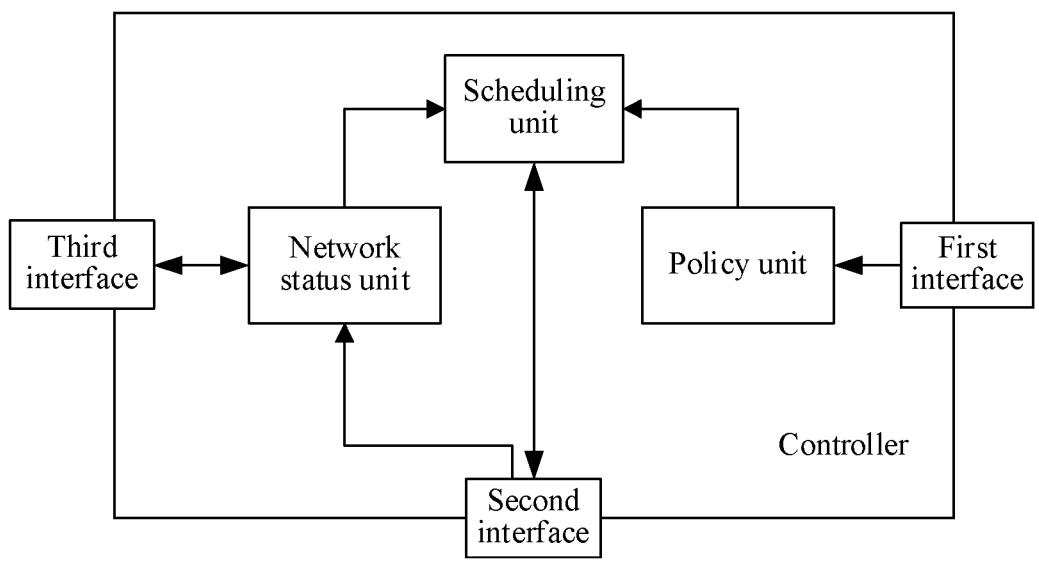
FIG. 2 is a schematic structural diagram of a controller according to an embodiment of the application.

FIG. 2 is a schematic structural diagram of a controller according to an embodiment of the application. As shown in FIG. 2, the controller includes a first interface, a second interface, a third interface, a network status unit, a policy unit, and a scheduling unit.

The controller is connected to a network management server by using the first interface, and the first interface is configured to receive an SLA that is signed by an SD-WAN user and that is sent by the network management server. Inside the controller, the first interface is connected to the policy unit, and the policy unit stores the SLA that is signed by the SD-WAN user and that is received by the first interface. In addition, the policy unit of the controller further maintains service level information of the SD-WAN user based on the SLA signed by the network management server and the SD-WAN user, and provides a corresponding service for the SD-WAN user based on the service level information.

The controller is connected to a network switch by using the second interface, and the second interface is configured to receive a network status message, an access request message, and a disconnection message that are sent by the network switch. In the controller, the second interface is separately connected to the network status unit and the scheduling unit. The network status unit is configured to obtain the network status message that is received by the second interface, and the scheduling unit is configured to obtain the access request message and the disconnection message that are received by the second interface.

The network status message includes a quantity of MPLS paths and common internet paths in a current network, usage of each MPLS path and each internet path, and a remaining available bandwidth of each MPLS path and each internet path. The network status unit is connected to the second interface, and the network status unit is configured to store the network status message received by the second interface.

The scheduling unit determines a transmission path of a to-be-served flow and a transmission path of a being-served flow based on the access request message, the network status message, and the service level information that is included in the policy unit.

In addition, the scheduling unit further updates the service level information of the SD-WAN user based on an allocated path or the received disconnection message. For example, a current service level is determined based on the allocated path and a period of service time, and a remaining period of service time is determined based on the period of service time.

Optionally, the SD-WAN user is further connected to the controller by using the third interface on the controller. The SD-WAN user may send an SLA service completion status query request to the controller. The controller returns the service level information corresponding to the SD-WAN user to the SD-WAN user based on the SLA service completion request query request sent by the SD-WAN user.

Figure 3:
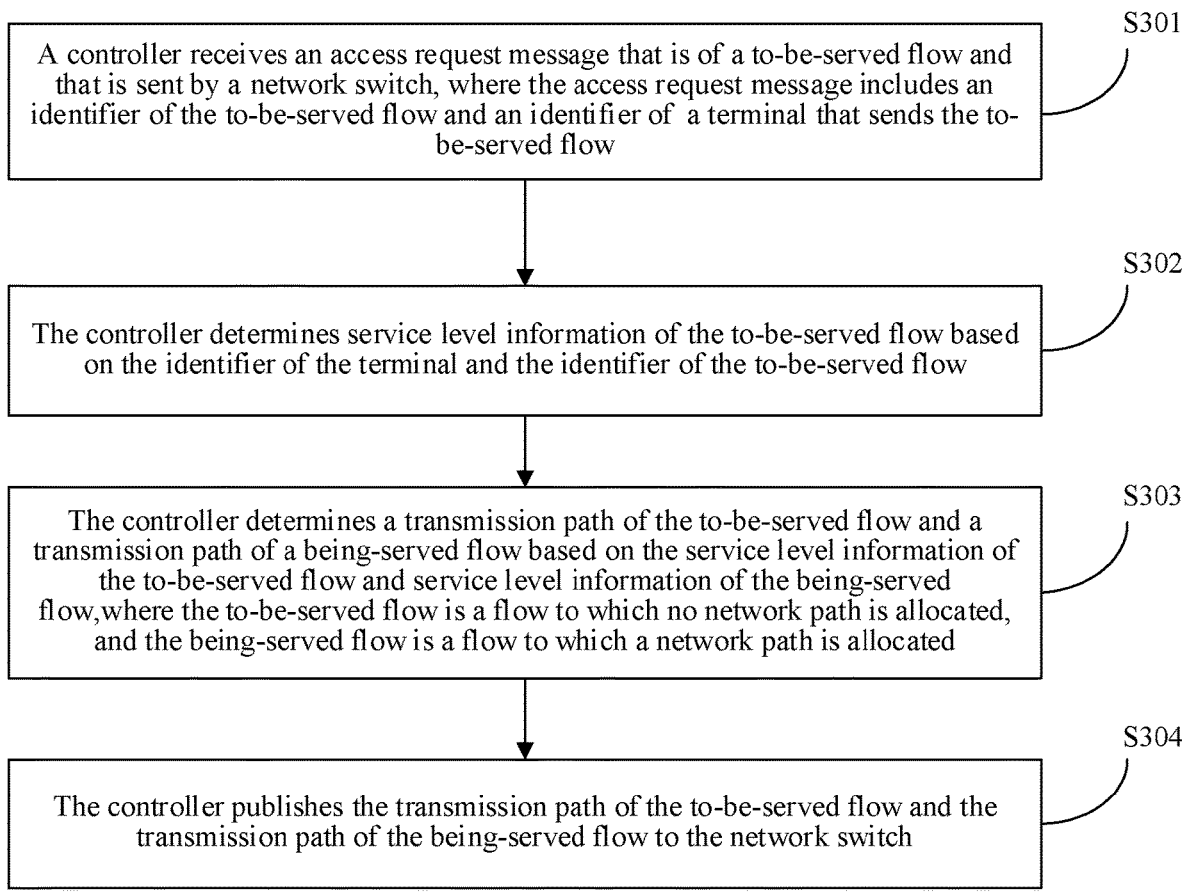
FIG. 3 shows a service management method in a system according to an embodiment of the application.

FIG. 3 shows a service management method according to an embodiment of the application. The method includes the following operations.

S301: A controller receives an access request message that is of a to-be-served flow and that is sent by a network switch, where the access request message includes an identifier of the to-be-served flow and an identifier of a terminal that sends the to-be-served flow.

Before receiving the access request message sent by the network switch, the controller further includes: receiving a service level agreement that is signed by an SD-WAN user and that is sent by a network management server. The SLA may include but is not limited to a service class, a service level, and a total service time. The controller receives the SLA that is signed by the SD-WAN user and that is sent by the network management server, and determines service level information based on the SLA.

In an example, Table 1 is a service level information table provided in an embodiment of the application. An SD-WAN user identifier, a service class, a target service level, a current service level, a total service time, and a remaining period of service time of the user are included. Table 1 includes a user 1, a user 2, and a user 3. Service classes of the user 1 and the user 2 are 3, and a service class of the user 3 is 2.

TABLE 1

| | User identifier | | |
|---|---|---|---|
| | User 1 | User 2 | User 3 |
| Service class | 3 | 3 | 2 |
| Target service level | Bandwidth (>100M, 99%) | Bandwidth (>70M, 99%) | Bandwidth (>40M, 95%) |
| Total service time | 100 | 100 | 100 |
| Remaining period of service time | 50 (50%) | 50 (50%) | 10 (10%) |
| Current service level | 80% | 100% | 80% |

When an SLA signed by the SD-WAN user for different flow types includes a plurality of different service classes, the controller provides different transmission paths for the different flow types based on the different service classes signed by the SD-WAN user. The controller updates the current service level and service time in the service level information based on a service actually provided for the SD-WAN user.

It should be noted that the network switch is an access node of a wide area network, and the terminal is connected to a destination device by using the network switch, to access the destination address.

The network management server (also referred to as a service provider) is configured to manage a wide area network service. The network management server provides the service level agreement. The service level agreement includes a plurality of different classes of services that can be provided by the network management server, and each class of service corresponds to a specific service level. The network management server provides, based on the SLA signed between the network management server and the software-defined networking in a wide area network user (the SD-WAN user may also be referred to as a user) for the SD-WAN user or a terminal corresponding to the SD-WAN user, a service level corresponding to the SLA signed by the SD-WAN user. In addition, the SD-WAN user provides, based on the signed SLA, a wide area network access service for the terminal corresponding to the SD-WAN user (the terminal corresponding to the SD-WAN user may also be referred to as a terminal).

In an embodiment of the application, the terminal corresponding to the SD-WAN user may be any device that can be connected to a network, such as a mobile phone, a tablet computer, a personal computer, or a smartwatch.

In an example, Table 2 shows a to-be-signed service level agreement according to an embodiment of the application. The to-be-signed service level agreement includes a service class and a service level. Each service class corresponds to a different service level. A service level corresponding to a service class 1 guarantees that a bandwidth is greater than or equal to 100 M in 90% of a period of service time. A service level corresponding to a service class 2 guarantees that a bandwidth is greater than or equal to 100 M in 95% of a period of service time. A service level corresponding to a service class 3 guarantees that a bandwidth is greater than or equal to 100 M in 99% of a period of service time. When receiving the SLA, the SD-WAN user selects a corresponding target service level based on a requirement. The target service level includes a target service class and a target service time.

TABLE 2

| Service class | Service level |
|---|---|
| 3 | Bandwidth (>100M, 99%) |
| 2 | Bandwidth (>100M, 95%) |
| 1 | Bandwidth (>100M, 90%) |

In an embodiment of the application, the service class determined by the SD-WAN user may include at least one service class. The SLA shown in Table 2 is merely an example of an embodiment of the application, and cannot be used to limit the application. In an embodiment of the application, the SLA provided by the network management server may include a service of any class.

In a first example in which an SD-WAN user signs an SLA, a terminal corresponding to the SD-WAN user includes a relatively small quantity of services that use a video conference (the video conference has a relatively high requirement on quality of service) and a relatively large quantity of services that use a web page access (web page browsing has a relatively low requirement on the quality of service). In this case, the SD-WAN user subscribes to 50 hours of the service class 3 and 100 hours of the service class 1 per month. For each signed service class, the SD-WAN user can also specify an application that uses the service class. The SLA signed by the SD-WAN user may be specifically shown in Table 3.

TABLE 3

| Service class | Service level | Service time/Charging period | Application type |
|---|---|---|---|
| 3 | Bandwidth (>100M, 99%) | 50 hours/1 month | Video conference application |
| 1 | Bandwidth (>100M, 90%) | 100 hours/1 month | Web browsing application |

In a second example in which an SD-WAN user signs an SLA, a terminal may perform a large quantity of file transfers and a small quantity of web page browsing services by using the wide area network. The SD-WAN user subscribes to 100 hours of the service class 2 and 50 hours of the service class 1 per month. For each service class, the SD-WAN user can specify a specific application type that can use a specific service class by default. The SLA signed by the SD-WAN user may be shown in Table 4.

TABLE 4

| Service class | Service level | Service time/Charging period | Application type |
|---|---|---|---|
| 2 | Bandwidth (>100M, 95%) | 100 hours/1 month | File transfer application |
| 1 | Bandwidth > 100M, 90%) | 50 hours/1 month | Web browsing application |

Figure 4:
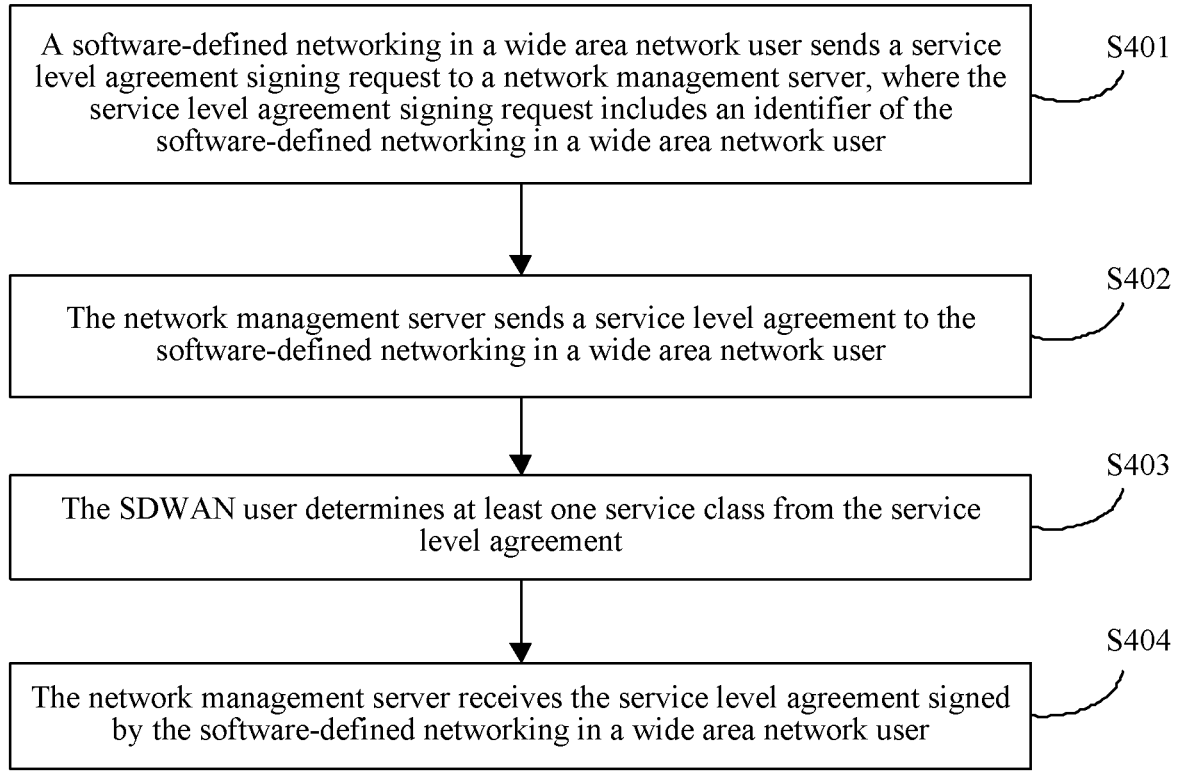
FIG. 4 shows a service level agreement signing method according to an embodiment of the application.

FIG. 4 shows a service level agreement signing method according to an embodiment of this application. As shown in FIG. 4, the method includes the following operations.

S401: An SD-WAN user sends a service level agreement signing request to a network management server, where the service level agreement signing request includes an SD-WAN user identifier.

S402: The network management server sends a service level agreement to the SD-WAN user.

The service level agreement includes a service class, a target service level, a current service level, and a remaining period of service time of a flow. The service level agreement is used to serve transmission of different flow types. The service level agreement includes a plurality of service classes, and each of the plurality of service classes corresponds to a different target service level. The target service level includes a service bandwidth and a service achievement rate. The service level agreement is used by the SD-WAN user to sign a required service class based on a required bandwidth and time and specify a period of service time of the service class. In an example, the service level agreement sent by the network management server to the SD-WAN user may be shown in Table 2.

S403: The SD-WAN user determines at least one service class from the service level agreement.

The service class selected by the SD-WAN user may be one or more classes in the service level agreement, a period of service time provided by each class per month, an application using each service class, and a total service time.

After determining the service class that needs to be signed, the SD-WAN user further sends the signed service class to the network management server.

S404: The network management server receives the service level agreement signed by the SD-WAN user.

The service level agreement that is signed by the SD-WAN user and that is received by the network management server includes the SD-WAN user identifier, the service class, the target service level, the total service time, and an application using the service class. The network management server establishes, a correspondence between the SD-WAN user and the service level agreement signed by the SD-WAN user. When the service signing request sent by the SD-WAN user is a service level agreement modification request, the network management server updates the correspondence between the SD-WAN user and the service level agreement signed by the SD-WAN user.

When obtaining the SLA signed by the SD-WAN user, the network management server further sends the SLA signed by the SD-WAN user to a controller. So that the controller obtains the SLA signed by the network management server and the SD-WAN user, and provides a service for a terminal corresponding to the SD-WAN user based on the SLA signed by the SD-WAN user.

Optionally, corresponding to the service level agreement signed by the SD-WAN user shown in FIG. 4, the SD-WAN user may further send a service level agreement modification request to the network management server, to modify the signed service level agreement.

The service level agreement modification request sent by the SD-WAN user to the network management server includes the SD-WAN user identifier, and the SD-WAN user identifier is used to indicate identity information of the user, for example, an IP address or a port number, or other information that can indicate a user identity.

The network management server determines, based on the SD-WAN user identifier included in the request, current service level information of the service class signed by the SD-WAN user. The network management server sends, to the SD-WAN user, the service level information of the service class that has been signed by the SD-WAN user and the to-be-signed service level agreement. The service level information of the signed service class may be the service level information of any user in Table 1, and the to-be-signed service level agreement may be shown in Table 2.

When the service signing request sent by the SD-WAN user is the service level agreement modification request, the SD-WAN user further needs to determine whether to cancel the signed service level agreement. The network management server updates, the correspondence between the SD-WAN user and the service level agreement signed by the SD-WAN user.

After obtaining the SLA signed by the SD-WAN user or the updated SLA, the network management server further sends the SLA signed by the SD-WAN user to a controller. So that the controller obtains the SLA signed by the network management server and the SD-WAN user, and provides a service for a terminal corresponding to the SD-WAN user based on the SLA signed by the SD-WAN user.

S302: The controller determines service level information of the to-be-served flow based on the identifier of the terminal and the identifier of the to-be-served flow.

In an embodiment, the controller determines, based on the identifier of the terminal, an SD-WAN user corresponding to the terminal sending the to-be-served flow, and determines a target service class of the to-be-served flow based on service class information. The controller determines the service level information of the to-be-served flow based on a determined SD-WAN user and the target service class. The service level information determined by the controller includes a target service level, a current service level, and a remaining period of service time, and the controller includes maintaining service level information of the SD-WAN user. Certainly, the service level information that is of the SD-WAN user and that is maintained in the controller may further include other information such as a total service time. This is not limited in the application.

That the controller determines the SD-WAN user based on the identifier of the terminal is described in the following. The identifier of the terminal included in the access request message may be an IP address or a port number of the terminal. The controller determines, based on the IP address or the port number of the terminal, the SD-WAN user corresponding to the terminal.

That the controller determines the target service class based on the service class information is described in the following.

In a first embodiment, an identifier of a flow includes a flow type. In an embodiment, when the SD-WAN user signs the service level agreement with the network management server, an application that is specified to use a flow of the service class is included. When receiving an access request message of the flow, the controller determines, based on the flow type included in the access request message, the service class required by the flow.

In a second embodiment, an identifier of a flow is a service class of the to-be-served flow.

S303: The controller determines a transmission path of the to-be-served flow and a transmission path of a being-served flow based on the service level information of the to-be-served flow and service level information of the being-served flow, where the to-be-served flow is a flow to which no network path is allocated, and the being-served flow is a flow to which a network path is allocated.

The service level information of the to-be-served flow includes a service class, a target service level, a current service level, and a remaining period of service time of the to-be-served flow. The controller determines the transmission path of the to-be-served flow and the transmission path of the being-served flow based on service classes, target service levels, current service levels, and remaining periods of service time of the to-be-served flow and the being-served flow.

Certainly, the controller may further determine the transmission path of the to-be-served flow and the transmission path of the being-served flow based on the network status message and traffic of the flow. The controller may store the network status message.

The controller receives a network status message sent by a network device. The network status message includes a network available path type, a quantity of links of each path type, and a remaining available bandwidth of each link. The controller determines the transmission path of the to-be-served flow and the transmission path of the being-served flow based on the available path type, the quantity of links of each path type, the remaining available bandwidth of each link, and bandwidths required by the to-be-served flow and the being-served flow.

The available path type includes a first path type and a second path type, the first path type is a multi-protocol label switching MPLS path that needs to ensure flow transmission quality, and the second path type is a common path that does not need to ensure the flow transmission quality.

An example in which the controller determines the transmission path of the to-be-served flow and the transmission path of the being-served flow based on the service level information of the to-be-served flow and the service level information of the being-served flow is used below for description.

In an embodiment, the transmission path of the to-be-served flow and the transmission path of the being-served flow are determined by using a constraint condition, and the constraint condition includes:

$$\text{Maxmize } \Sigma_{j,k} W_j^k x_j^k; \quad\quad 1\text{-}1$$

$$x_j^k - \Sigma_m y_{j,m}^k = 1 \forall j,k; \quad\quad 1\text{-}2$$

$$\Sigma_{m,j,k} e_m y_{j,m}^k v_j^k \le c_e, \forall e; \quad\quad 1\text{-}3$$

$w_j^k$ is a priority parameter. A priority parameter of a k-level service class request of a user j may be determined based on a target service level, a corrected parameter, a current service level, and a remaining period of service time of the user.

In a more specific example, a formula for calculating the priority parameter is as follows:

$$w_j^k = k + c_j^k + \lambda_j (c_j^k - b_j^k)(1 - Q_j^k)/Q_j^k \quad\quad 1\text{-}4$$

$c_j^k$ is used to indicate the target service level of the k-level service class requested by the user j, $b_j^k$ is used to indicate the current service level of the k-level service class requested by the user j, $Q_j^k$ is used to indicate a percentage of the remaining period of service time of the k-level service class requested by the user j, and $\lambda_j$ is the corrected parameter of the user j.

$y_{j,m}^k$ parameter is used to indicate whether the k-level service class requested by user j is allocated to an $m^{th}$ MPLS path. When the k-level service class requested by the user j is established on the $m^{th}$ MPLS path, a value of $y_{j,m}^k$ is 1. When the k-level service class requested by the user j is not established on the $m^{th}$ MPLS path, a value of $y_{j,m}^k$ is 0, and $e_m$ is used to indicate whether the $m^{th}$ MPLS passes through a link e. When the $m^{th}$ MPLS passes through the link e, a value of $e_m$ is 1. When the $m^{th}$ MPLS does not pass through the link e, the value of $e_m$ is 0. $c_e$ is used to indicate a link bandwidth of the link e, $v_j^k$ is used to indicate a bandwidth required by the k-level service class requested by the user j, and $x_j^k$ is used to indicate whether the k-level service class requested by the user j is allocated to an MPLS path. A value of $x_j^k$ may include two variables: 0 and 1. When the k-level service class requested by the user j is established on the MPLS path, the value of $x_j^k$ is 1. When the k-level service class requested by the user j is established on an internet path, a value of $x_j^k$ is 0.

It should be noted that the user includes SD-WAN users corresponding to all to-be-served flows and being-served flows.

According to the foregoing constraint condition, it is determined that the k-level service class requested by the user j is established on the MPLS path or the internet path. When $x_j^k$ is equal to 1, the k-level service class requested by the user j is established on the MPLS path. When $x_j^k$ is equal to 0, the k-level service class requested by the user j is established on the internet path.

The network management server may adjust the corrected parameter based on an actual situation, to adjust the priority parameter, which improves flow transmission efficiency. For example, in the first embodiment, the network management server further includes maintaining class information of the SD-WAN user. The SLA that is signed by the SD-WAN user and that is sent by the network management server to the controller includes a user class, and the corrected parameter of the user j adjusts a corresponding corrected parameter based on a class of the SD-WAN user. In the second embodiment, the network management server determines a corresponding corrected parameter based on an additional condition that is in the service level agreement signed by the SD-WAN user and that cannot reach the target service level in the service level agreement. The SLA that is signed by the SD-WAN user and that is sent by the network management server to the controller further includes a corrected parameter for each service class.

Certainly, in addition to adjusting corrected parameters of different SD-WAN users based on the foregoing fixed factors, the network management server may further adjust the corrected parameter of the SD-WAN user based on the obtained service level information.

In an example, when the remaining period of service time of the SD-WAN user corresponding to the terminal is less than a first time threshold and/or the current service level of the SD-WAN user is less than a specified service level threshold, the controller increases or decreases a value of the corrected parameter of the SD-WAN user.

In another example, when the remaining period of service time of the SD-WAN user is less than a fourth time threshold and the current service level is less than a fifth threshold of the target service level, the controller sends service level information of a flow to the network management server. The network management server determines a service policy of the flow based on the service level information of the flow. For example, the network management server may adjust a corrected parameter of the flow based on a current service level of the flow. The network management server sends an adjusted corrected parameter to the controller, so that when determining the transmission path of the to-be-served flow and the transmission path of the being-served flow, the controller determines the transmission path of the to-be-served flow and the transmission path of the being-served flow based on the adjusted corrected parameter.

Optionally, when determining the transmission path of the to-be-served flow and the transmission path of the being-served flow, the controller preferentially determines a transmission path of a flow whose target service class is 3, and then determines a transmission path of a flow whose target service class is another class.

In an embodiment, an A1 flow included in the flows whose target service classes are 3 is determined in the to-be-accessed flow and the being-served flow, and the A1 flow is a flow sent by using a first path. The A1 flow may be determined by using formulas 1-1, 1-2, and 1-3.

An A2 flow included in the flows whose service classes are 3 is determined. Flows whose target service classes are not 3 included in the to-be-served flow and the being-served flow are determined. The A2 flow is a flow other than the A1 flow in the flows whose target service levels are 3.

It is determined, by using formulas 1-1, 1-2, 1-3, and 1-4, that the A2 flow and a flow of the second service class are the first path or a second path.

The following describes, by using an example, a path for determining a flow based on a constraint condition.

For example, the network switch may currently forward data by using an MPLS path M1, and a current available bandwidth of M1 is 150 M. M1 includes only one link M11. Currently, the controller needs to allocate links to the following flows: a user 1, a user 2, a user 3, and a user 4. The corrected parameters of the user 1 to the user 4 are all 1.

Service level information of the user 1 to the user 4 maintained in the controller is shown in Table 5:

TABLE 5

|  | User 1 | User 2 | User 3 | User 4 |
| --- | --- | --- | --- | --- |
| Service class | 3 | 3 | 2 | 2 |
| Target service level | Bandwidth (>100M, 99%) | Bandwidth (>70M, 99%) | Bandwidth (>40M, 95%) | Bandwidth (>30M, 95%) |
| Total service time | 100 | 100 | 100 | 100 |
| Remaining period of service time | 50 (50%) | 50 (50%) | 10 (10%) | 90 (90%) |
| Current service level | 80% | 100% | 80% | 90% |
| Description | There is a risk of non-compliance | Up to now, more than compliance | There is a risk of non-compliance | Currently, up to compliance |

Based on the priority parameter formula:

$$w_j^k = k + c_j^k + \lambda_j(c_j^k - b_j^k)(1 - Q_j^k)/Q_j^k$$

Priority parameters of the user 1 to the user 4 are determined as follows:

$$w_1^3 = 3 + 0.99 + \frac{1(0.99 - 0.8)(1 - 0.5)}{0.5} = 4.18$$

$$w_2^3 = 3 + 0.99 + \frac{1(0.99 - 1)(1 - 0.5)}{0.5} = 3.98$$

$$w_3^2 = 2 + 0.95 + \frac{1(0.95 - 0.8)(1 - 0.1)}{0.1} = 4.3$$

$$w_4^2 = 2 + 0.95 + \frac{1(0.95 - 0.9)(1 - 0.9)}{0.9} = 2.96$$

Therefore, it is determined that a value of a priority parameter $w_1^3$ of the user 1 is 4.18, a value of a priority parameter $w_2^3$ of the user 2 is 3.98, a value of a priority parameter $w_3^2$ of the 2 user 3 is 4.3, and a value of a priority parameter $w_4^2$ of the user 4 is 2.96.

According to the target service class, it is determined that a bandwidth required by the user 1 is 100 M, a bandwidth required by the user 2 is 70 M, a bandwidth required by the user 3 is 40 M, and a bandwidth required by the user 4 is 30 M. And it is determined that a current available bandwidth of the MPLS is 150.

Based on a bandwidth constraint:

$$\Sigma_{m,j,k} e_m y_{j,m}^k v_j^k \leq c_e, \forall e$$

A bandwidth of a flow that may be carried on the link e in the $m^{th}$ MPLS path is less than the remaining bandwidth of the link e in the $m^{th}$ MPLS path. The link e in the $m^{th}$ MPLS path is each link in each MPLS path.

Therefore, a solution of determining, based on the foregoing constraint, that the MPLS may be used to send the user 1 to the user 4 includes:

Solution 1: Users 2, 3, and 4 are forwarded on the MPLS path, and the user 1 is forwarded on the internet path.

Solution 2: Users 1 and 3 are forwarded on the MPLS path, and users 2 and 4 are forwarded on the internet path.

Solution 3: Users 1 and 4 are forwarded on the MPLS path, and users 2 and 3 are forwarded on the internet path.

Calculating based on a constraint formula:

$$x_j^k - \Sigma_m y_{j,m}^k = 1 \forall j,k$$

It is determined that the k-level request of the user j is established on at most one MPLS path.

In this example, because only one MPLS is included, it may be determined that $x_j^k$ of each user may be 1.

Calculating based on a constraint formula:

$$\text{Maxmize } \Sigma_{j,k} W_j^k x_j^k$$

It is determined that a sum of products of priority parameters of k-level service classes requested by the user j in all k-level service classes requested by the user j and a value indicating whether the k-level service class requested by the user j is established on the first path is the largest.

In this example, because $x_j^k$ of all users may be 1, it is determined that a sum of the product of the priority parameters of k-level service classes requested by the user j in all the k-level service classes requested by the user j and the value indicating whether the k-level service class requested by the user j is established on the first path is equal to a sum of the priority parameters of k-level service classes requested by the user j in all the k-level service classes requested by the user j.

Therefore:

Solution 1: 3.95+4.3+2.96=11.21;

Solution 2: 4.18+4.3=8.48; and

Solution 3: 4.18+2.96=7.14.

Because in the solution 1, a sum calculated based on the formula 1-1 is the largest, the solution 1 meets requirements of the foregoing formulas 1-1, 1-2, and 1-3 at the same time. It is determined that the flows of the user 2, the user 3, and the user 4 are transmitted on the MPLS path, and the flow of the user 1 is transmitted on the internet path.

S304: The controller publishes the transmission path of the to-be-served flow and the transmission path of the being-served flow to the network switch.

There are a plurality of network switches in the SD-WAN network, and the controller further separately sends the transmission path of the to-be-served flow and the transmission path of the being-served flow to the plurality of network switches in the SD-WAN network. When the network switch receives the transmission path of the to-be-served flow and the transmission path of the being-served flow that are sent by the controller, the network switch configures a flow table for the to-be-served flow, and reconfigures a flow table for the being-served flow whose path changes, to send the to-be-served flow and the being-served flow by using the configured flow table.

According to the service management method provided in the application, when the path of the to-be-served flow is determined, the transmission path of the to-be-served flow and the transmission path of the being-served flow in the network are determined at the same time. This avoids a defect that only a single flow is adjusted and the to-be-served flow always cannot reach the target service level.

Figure 5:
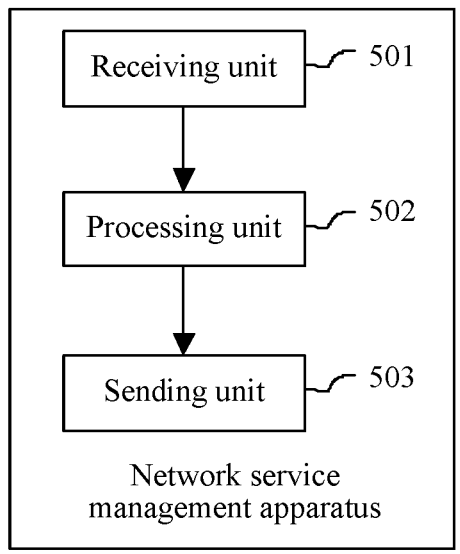
FIG. 5 shows a network service management apparatus according to an embodiment of the application.

FIG. 5 shows a network service management apparatus according to an embodiment of the application. FIG. 5 shows an embodiment of the controller corresponding to FIG. 3. For same content as FIG. 3 in FIG. 5, refer to the embodiment corresponding to FIG. 3. Referring to FIG. 5, the service management apparatus includes the following units:

a receiving unit 501, configured to receive an access request message that is of a to-be-served flow and that is sent by a network switch, where the access request message includes an identifier of the to-be-served flow and an identifier of a terminal that sends the to-be-served flow;

a processing unit 502, configured to determine service level information of the to-be-served flow based on the identifier of the to-be-served flow and the identifier of the terminal, where the processing unit 502 is further configured to determine a transmission path of the to-be-served flow and a transmission path of a being-served flow based on the service level information of the to-be-served flow and service level information of the being-served flow, where the to-be-served flow is a flow to which no network path is allocated, and the being-served flow is a flow to which a network path is allocated; and a sending unit 503, configured to publish the transmission path of the to-be-served flow and the transmission path of the being-served flow to the network switch.

In the embodiment shown in FIG. 5, optionally, the receiving unit 501 is configured to receive a network status message sent by the network device, where the network status message includes a network available path type, a quantity of links of each path type, and a remaining available bandwidth of each link; and the processing unit is configured to determine the transmission path of the to-be-served flow and the transmission path of the being-served flow based on the available path type, the quantity of links of each path type, the remaining available bandwidth of each link, and bandwidths required by the to-be-served flow and the being-served flow, where the available path type includes a first path type and a second path type, the first path type is a multi-protocol label switching MPLS path that needs to ensure flow transmission quality, and the second path type is a common path that does not need to ensure the flow transmission quality.

In the embodiment shown in FIG. 5, optionally, that the processing unit 502 is configured to determine a transmission path of the to-be-served flow and a transmission path of a being-served flow based on the service level information of the to-be-served flow and service level information of the being-served flow includes: that the service level information includes a service class, a target service level, a current service level, and a remaining period of service time of a transmission flow; and the processing unit 502, configured to determine the transmission path of the to-be-served flow and the transmission path of the being-served flow based on service levels, target service levels, current service levels, and remaining periods of service time of the to-be-served flow and the being-served flow.

In the embodiment shown in FIG. 5, optionally, that the processing unit 502 is configured to determine a transmission path of the to-be-served flow and a transmission path of a being-served flow based on the service level information of the to-be-served flow and service level information of the being-served flow includes:

the processing unit 502, configured to determine the transmission path of the to-be-served flow and the transmission path of the being-served flow by using a constraint condition, where the constraint condition includes:

Maxmize $\Sigma_{j,k} W_j^k x_j^k$;
$x_j^k - \Sigma_m y_{j,m}^k = 1 \forall j,k$; and
$\Sigma_{m,j,k} e_m y_{j,m}^k \upsilon_j^k \leq c_e$, $\forall e$, where
a priority parameter $w_j^k = k + c_j^k + \lambda_j (c_j^k - b_j^k)(1 - Q_j^k)/Q_j^k$; and $y_{j,m}^k$ is used to indicate whether a k-level service class requested by a user j is allocated to an $m^{th}$ MPLS path, $e_m$ is used to indicate whether the $m^{th}$ MPLS passes through a link e, $c_e$ is used to indicate a link bandwidth of the link e, $\upsilon_j^k$ is used to indicate a bandwidth required by the k-level service class requested by the user j, $x_j^k$ is used to indicate whether the k-level service class requested by the user j is allocated to the MPLS path, $c_j^k$ is used to indicate a target service level of the k-level service class requested by the user j, $b_j^k$ is used to indicate a current service level of the k-level service class requested by the user j, $Q_j^k$ is used to indicate a percentage of a remaining period of service time of the k-level service class requested by the user j, and $\lambda_j$ is a corrected parameter of the user j.

In the embodiment shown in FIG. 5, optionally, when a remaining period of service time of a software-defined networking in a wide area network SD-WAN user corresponding to the terminal is less than a first time threshold and/or a current service level of the SD-WAN user is less than a specified service level threshold, the processing unit 502 is further configured to increase a value of a corrected parameter of the SD-WAN user.

In the embodiment shown in FIG. 5, optionally, that the processing unit 502 is further configured to determine service level information of the to-be-served flow based on the identifier of the to-be-served flow and the identifier of the terminal includes: that the identifier of the terminal is an IP address or a port number of the terminal, and the processing unit 502, configured to determine the SD-WAN user corresponding to the terminal based on the IP address or the port number of the terminal; that the identifier of the to-be-served flow is a flow type, and the processing unit 502, configured to determine a service class of the to-be-served flow based on a type of the to-be-served flow; and the processing unit, configured to determine service level information of the to-be-served flow based on the SD-WAN user and the service level.

In the embodiment shown in FIG. 5, optionally, when a period of service time of the SD-WAN user is less than a second threshold, the processing unit 502 is configured to send warning information to a network management server, to send the warning information to the SD-WAN user by using the network management server.

The network service management apparatus shown in FIG. 5 may be the controller in FIG. 1, or may be the controller in FIG. 2, or may be the controller in FIG. 3 and FIG. 4. Operations performed by the controller in the embodiments in FIG. 1 to FIG. 4 and embodiments are also applicable to the network service management apparatus shown in FIG. 5 in an embodiment. For brevity of the specification, details are not described herein again.

Figure 6:
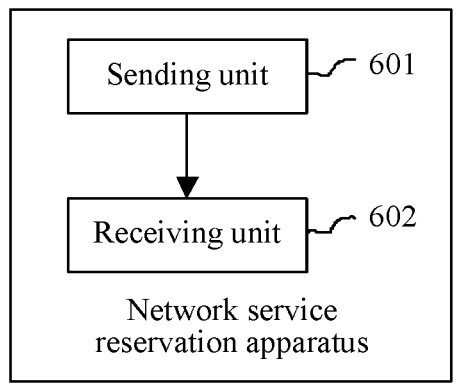
FIG. 6 shows a network service reservation apparatus according to an embodiment of the application.

FIG. 6 shows a network service reservation apparatus according to an embodiment of the application. Referring to FIG. 6, the network service reservation apparatus includes:

a sending unit 601, configured to send a service level agreement to an SD-WAN user, where the service level agreement includes a service class, a target service level, a current service level, and a remaining period of service time of a flow, and the service level agreement is used to serve transmission of different flow types; and a receiving unit 602, configured to receive a service level agreement signed by the SD-WAN user, where the service level agreement includes at least one service class, where the sending unit 601 is further configured to send the service level agreement signed by the SD-WAN user to a controller, so that the controller determines a transmission path of a flow of the SD-WAN user based on the service level agreement signed by the SD-WAN user.

Figure 7:
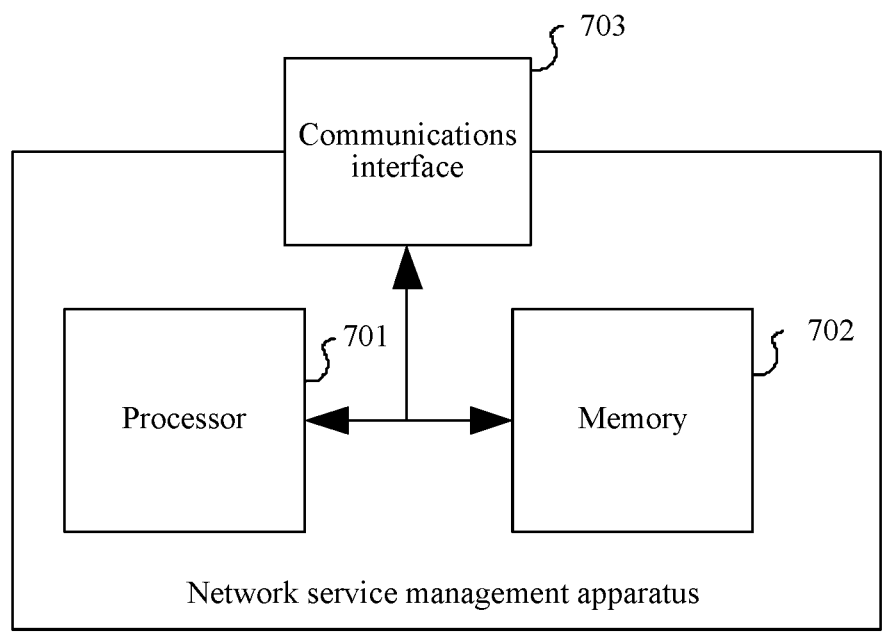
FIG. 7 is a schematic diagram of a network service management apparatus according to an embodiment of the application.

FIG. 7 is a schematic diagram of a network service management apparatus according to an embodiment of the application.

As shown in FIG. 7, the network service management apparatus includes a processor 701, a memory 702, and a communications interface 703.

The processor 701 may be a general-purpose central processing unit (CPU), a microprocessor, an application-specific integrated circuit (ASIC), or one or more integrated circuits, and is configured to execute a related program to implement the technical solutions provided in the foregoing method embodiments of the invention.

The memory 702 may be a read only memory (ROM), a static storage device, a dynamic storage device, or a random access memory (RAM). The memory 702 may store an application program. When the technical solutions provided in the embodiments of the invention are implemented by using software or firmware, program code used to implement any optional technical solution provided in the operations and method embodiments of the controller in FIG. 3 and FIG. 4 is stored in the memory 702, and is executed by the processor 701.

The communications interface 703 is configured to communicate with another switch, a network management server, or an SD-WAN user.

The communications interface 703 is configured to receive an access request message that is of a to-be-served flow and that is sent by a network device, where the access request message includes an identifier of the to-be-served flow and an identifier of a terminal that sends the to-be-served flow. The processor 701 determines service level information of the to-be-served flow based on the identifier of the terminal and the identifier of the to-be-served flow. The processor 701 determines transmission path of the to-be-served flow and a transmission path of a being-served flow based on the service level information of the to-be-served flow and service level information of the being-served flow, where the to-be-served flow is a flow to which no network path is allocated, and the being-served flow is a flow to which a network path is allocated. The communications interface 703 publishes the transmission path of the to-be-served flow and the transmission path of the being-served flow to the network device.

The communications interface 703 further receives a network status message sent by the network device, where the network status message includes a network available path type, a quantity of links of each path type, and a remaining available bandwidth of each link. The processor 701 determines the transmission path of the to-be-served flow and the transmission path of the being-served flow based on the available path type, the quantity of links of each path type, the remaining available bandwidth of each link, and bandwidths required by the to-be-served flow and the being-served flow. The available path type includes a first path type and a second path type, the first path type is a multi-protocol label switching MPLS path that needs to ensure flow transmission quality, and the second path type is a common path that does not need to ensure the flow transmission quality.

That the processing unit 701 determines a transmission path of the to-be-served flow and a transmission path of a being-served flow based on the service level information of the to-be-served flow and service level information of the being-served flow includes: that the service level information includes a service class, a target service level, a current service level, and a remaining period of service time of a transmission flow. The processing unit 701 determines the transmission path of the to-be-served flow and the transmission path of the being-served flow based on service levels, target service levels, current service levels, and remaining periods of service time of the to-be-served flow and the being-served flow.

That the processing unit 701 determines a transmission path of the to-be-served flow and a transmission path of a being-served flow based on the service level information of the to-be-served flow and service level information of the being-served flow includes: the processing unit 701, configured to determine the transmission path of the to-be-served flow and the transmission path of the being-served flow by using a constraint condition, where the constraint condition includes:

Maxmize $\Sigma_{J,k} W_j^k x_j^k$;

$x_j^k - \Sigma_m y_{j,m}^k = 1 \forall j, k$; and $\Sigma_{m,j,k} e_m y_{j,m}^k \upsilon_j^k \leq c_e$, $\forall e$, where a priority parameter $w_j^k = k + c_j^k + \lambda_j (c_j^k - b_j^k)(1 - Q_j^k)/Q_j^k$; and $y_{j,m}^k$ is used to indicate whether a k-level service class requested by a user j is allocated to an $m^{th}$ MPLS path, $e_m$ is used to indicate whether the $m^{th}$ MPLS passes through a link e, $c_e$ is used to indicate a link bandwidth of the link e, $\upsilon_j^k$ is used to indicate a bandwidth required by the k-level service class requested by the user j, $x_j^k$ is used to indicate whether the k-level service class requested by the user j is allocated to the MPLS path, $c_j^k$ is used to indicate a target service level of the k-level service class requested by the user j, $b_j^k$ is used to indicate a current service level of the k-level service class requested by the user j, $Q_j^k$ is used to indicate a percentage of a remaining period of service time of the k-level service class requested by the user j, and $\lambda_j$ is a corrected parameter of the user j.

When a remaining period of service time of a software-defined networking in a wide area network (SD-WAN) user corresponding to the terminal is less than a first time threshold and/or a current service level of the SD-WAN user is less than a specified service level threshold, the processor 701 increases a value of a corrected parameter of the SD-WAN user.

That the processor 701 determines service level information of the to-be-served flow based on the identifier of the to-be-served flow and the identifier of the terminal includes: that the identifier of the terminal is an IP address or a port number of the terminal, and the processing unit 701, configured to determine the SD-WAN user corresponding to the terminal based on the IP address or the port number of the terminal. That the identifier of the to-be-served flow is a flow type, the processor 701 determines a service class of the to-be-served flow based on a type of the to-be-served flow. The processing unit 701 determines service level information of the to-be-served flow based on the SD-WAN user and the service level.

When a period of service time of the SD-WAN user is less than a second threshold, the processor 701 sends warning information to a network management server, to send the warning information to the SD-WAN user by using the network management server.

The network service management apparatus shown in FIG. 7 may be the controller in FIG. 1, or may be the controller in FIG. 2, or may be the controller in FIG. 3 and FIG. 4. Operations performed by the controller in the embodiments in FIG. 1 to FIG. 4 and embodiments are also applicable to the network service manager shown in FIG. 7 in an embodiment. For brevity of the specification, details are not described herein again.

Figure 8:
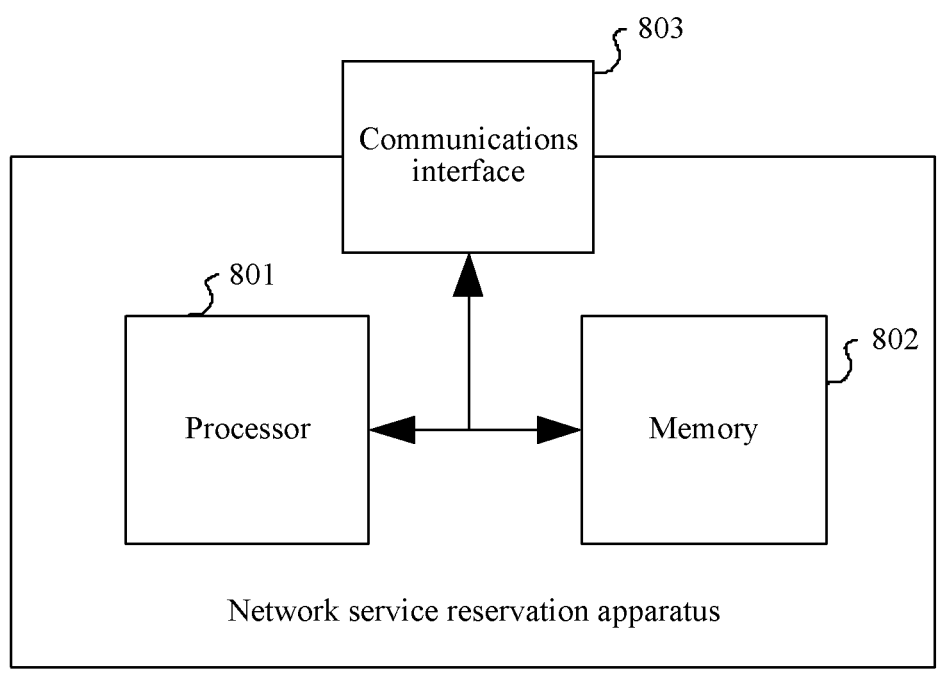
FIG. 8 is a schematic diagram of a network service reservation apparatus according to an embodiment of the application.

FIG. 8 is a schematic diagram of a network service reservation apparatus according to an embodiment of the application.

As shown in FIG. 8, the network service reservation apparatus includes a processor 801, a memory 802, and a communications interface 803.

The processor 801 may be a general-purpose central processing unit (CPU), a microprocessor, an application-specific integrated circuit (ASIC), or one or more integrated circuits, and is configured to execute a related program to implement the technical solutions provided in the foregoing method embodiments of the invention.

The memory 802 may be a read only memory (ROM), a static storage device, a dynamic storage device, or a random access memory (RAM). The memory 802 may store an application program. When the technical solution provided in an embodiment of the invention is implemented by using software or firmware, program code used to implement any optional technical solution provided in the foregoing method embodiments of the invention is stored in the memory 802, and is executed by the processor 801.

The communications interface 803 is configured to communicate with another network switch, a controller, or an SD-WAN user.

The communications interface 803 is configured to send a service level agreement to a software-defined networking in a wide area network SD-WAN user, where the service level agreement includes a service class, a target service level, a current service level, and a remaining period of service time of a flow, and the service level agreement is used to serve transmission of different flow types. The communications interface 803 receives a service level agreement signed by the SD-WAN user, where the service level agreement includes at least one service class. The communications interface 803 sends the service level agreement signed by the SD-WAN user to a controller, so that the controller determines a transmission path of a flow of the SD-WAN user based on the service level agreement signed by the SD-WAN user.

It should be noted that the embodiments provided in the application are merely optional embodiments described in the application. Based on this, one of ordinary skill in the art can design more embodiments, and details are not described herein again.

One of ordinary skill in the art may be aware that, in combination with the examples described in the embodiments disclosed in the specification, units and algorithm operations may be implemented by electronic hardware or a combination of computer software and electronic hardware. Whether the functions are performed by hardware or software depends on particular applications and design constraint conditions of the technical solutions. One of ordinary skill in the art may use different methods to implement the described functions for each particular application, but it should not be considered that the implementation goes beyond the scope of the application.

It may be clearly understood by one of ordinary skill in the art that, for the purpose of convenient and brief description, for a detailed working process of the foregoing system, apparatus, and unit, refer to a corresponding process in the foregoing method embodiments. Details are not described herein again.

In the several embodiments provided in the application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of the application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the operations of the methods described in the embodiments of the application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of the application, but are not intended to limit the protection scope of the application. Any variation or replacement readily figured out by one of ordinary skill in the art within the technical scope disclosed in the application shall fall within the protection scope of the application. Therefore, the protection scope of the application shall be subject to the protection scope of the claims.

The invention claimed is:

1. A network service management method comprising:
 receiving, by a controller, an access request message of a to-be-served flow from a network device, wherein the access request message comprises an identifier of the to-be-served flow and an identifier of a terminal that sends the to-be-served flow;
 determining, by the controller, service level information of the to-be-served flow based on the identifier of the terminal and the identifier of the to-be-served flow;
 determining, by the controller, a transmission path of the to-be-served flow based on the service level information of the to-be-served flow and a transmission path of a being-served flow based on service level information of the being-served flow, wherein the to-be-served flow is a flow to which no network path has been allocated, and the being-served flow is a flow to which a network path has been allocated, and wherein the being-served flow is other than the to-be served flow; and
 sending, by the controller, the transmission path of the to-be-served flow and the transmission path of the being-served flow to the network device.

2. The method according to claim 1, wherein the service level information comprises a service class, a target service level, a current service level, and a remaining period of service time of a transmission flow; and
 wherein the determining, by the controller, the transmission path of the to-be-served flow and the transmission path of a being-served flow based on the service level information of the to-be-served flow and service level information of the being-served flow comprises:
 determining, by the controller, the transmission path of the to-be-served flow and the transmission path of the being-served flow based on service classes, target service levels, current service levels, and remaining periods of service time of the to-be-served flow and the being-served flow.

3. The method according to claim 2, further comprising:
 when a remaining period of service time of a software-defined networking in a wide area network (SD-WAN) user corresponding to the terminal is less than a first time threshold, adjusting, by the controller, a value of a corrected parameter of the SD-WAN user.

4. The method according to claim 2, further comprising:
 when a current service level of a software-defined networking in a wide area network (SD-WAN) user is less than a second service level threshold, adjusting, by the controller, a value of a corrected parameter of the SD-WAN user.

5. The method according to claim 2, further comprising:
 when a period of service time of a software-defined networking in a wide area network (SD-WAN) user is less than a third threshold, sending, by the controller, warning information to the SD-WAN user by using a network management server.

6. The method according to claim 1, wherein the identifier of the terminal is an internet protocol (IP) address or a port number of the terminal, and the determining, by the controller, service level information of the to-be-served flow comprises:
determining, by the controller, a software-defined networking in a wide area network (SD-WAN) user corresponding to the terminal based on the IP address or the port number of the terminal.

7. The method according to claim 1, wherein the identifier of the to-be-served flow is a flow type, and wherein the method further comprises
determining, by the controller, a service class of the to-be-served flow based on a type of the to-be-served flow; and
determining, by the controller, the service level information of the to-be-served flow based on a software-defined networking in a wide area network (SD-WAN) user and the service class.

8. The method according to claim 1, further comprising:
receiving, by the controller, a network status message sent by the network device, wherein the network status message is associated with a status of path and link; and
determining, by the controller, the transmission path of the to-be-served flow and the transmission path of the being-served flow based on the network status message and bandwidths required by the to-be-served flow and the being-served flow.

9. The method according to claim 8, wherein the network status message comprises a network available path type, a quantity of links of each path type, and a remaining available bandwidth of each link.

10. A network service management apparatus, comprising:
a memory; and
a processor coupled to the memory, wherein the processor is configured to:
receive an access request message of a to-be-served flow from a network device, wherein the access request message comprises an identifier of the to-be-served flow and an identifier of a terminal that sends the to-be-served flow;
determine service level information of the to-be-served flow based on the identifier of the to-be-served flow and the identifier of the terminal;
determine a transmission path of the to-be-served flow based on the service level information of the to-be-served flow and a transmission path of a being-served flow based on service level information of the being-served flow, wherein the to-be-served flow is a flow to which no network path has been allocated, and the being-served flow is a flow to which a network path has been allocated, and wherein the being-served flow is other than the to-be served flow; and
send the transmission path of the to-be-served flow and the transmission path of the being-served flow to the network device.

11. The apparatus according to claim 10, wherein the service level information comprises a service class, a target service level, a current service level, and a remaining period of service time of a transmission flow; and
wherein the processor is further configured to: determine the transmission path of the to-be-served flow and the transmission path of the being-served flow based on service levels, target service levels, current service levels, and remaining periods of service time of the to-be-served flow and the being-served flow.

12. The apparatus according to claim 11, wherein the processor is further configured to:
adjust a value of a corrected parameter of a software-defined networking in a wide area network (SD-WAN) user when a remaining period of service time of the SD-WAN user corresponding to the terminal is less than a first time threshold.

13. The apparatus according to claim 11, wherein the processor is further configured to:
adjust a value of a corrected parameter of a software-defined networking in a wide area network (SD-WAN) user when a current service level of the SD-WAN user is less than a second service level threshold.

14. The apparatus according to claim 11, wherein the c the processor is further configured to:
send warning information to a software-defined networking in a wide area network (SD-WAN) user by using a network management server when a period of service time of the SD-WAN user is less than a third threshold.

15. The apparatus according to claim 10, wherein the identifier of the terminal is an internet protocol (IP) address or a port number of the terminal; and
wherein the processor is further configured to:
determine a software-defined networking in a wide area network (SD-WAN) user corresponding to the terminal based on the IP address or the port number of the terminal.

16. The apparatus according to claim 10, wherein the identifier of the to-be-served flow is a flow type; and
wherein the processor is further configured to:
determine a service class of the to-be-served flow based on a type of the to-be-served flow; and
determine the service level information of the to-be-served flow based on a software-defined networking in a wide area network (SD-WAN) user and the service class.

17. The apparatus according to claim 10, wherein the processor is further configured to:
receive a network status message sent by the network device, wherein the network status message is associated with a status of path and link; and
determine the transmission path of the to-be-served flow and the transmission path of the being-served flow based on the network status message and bandwidths required by the to-be-served flow and the being-served flow.

18. The apparatus according to claim 17, wherein the network status message comprises a network available path type, a quantity of links of each path type, and a remaining available bandwidth of each link.

19. The apparatus according to claim 18, wherein the available path type comprises a first path type and a second path type, the first path type is a multi-protocol label switching MPLS path that needs to ensure flow transmission quality, and the second path type is a network path that does not need to ensure the flow transmission quality.

20. A network service reservation apparatus, comprising:
a memory; and
a processor coupled to the memory, wherein the processor is configured to:
send a service level agreement to a software-defined networking in a wide area network (SD-WAN) user, wherein the service level agreement comprises a service class, a target service level, a current service level, and a remaining period of service time of a flow, and the service level agreement is used to serve transmission of different flow types;

receive a service level agreement signed by the SD-WAN user, wherein the service level agreement comprises at least one service class, and send the service level agreement signed by the SD-WAN user to a controller, so that the controller determines a transmission path of a flow of the SD-WAN user based on the service level agreement signed by the SD-WAN user.

* * * * *